US009956729B2

(12) United States Patent  
Bianchi et al.

(10) Patent No.: US 9,956,729 B2  
(45) Date of Patent: May 1, 2018

(54) METHOD OF MANUFACTURING A FOAM SHOWING A GRADIENT POISSON'S RATIO BEHAVIOUR

(71) Applicant: ROLLS-ROYCE PLC, London (GB)

(72) Inventors: Matteo Bianchi, Bristol (GB); Fabrizio Scarpa, Bristol (GB)

(73) Assignee: ROLLS-ROYCE plc, London (GB)

( * ) Notice: Subject to any disclaimer, the term of this patent is extended or adjusted under 35 U.S.C. 154(b) by 212 days.

(21) Appl. No.: 14/494,225

(22) Filed: Sep. 23, 2014

(65) Prior Publication Data

US 2015/0105482 A1 Apr. 16, 2015

(30) Foreign Application Priority Data

Oct. 14, 2013 (GB) .................................. 1318129.2

(51) Int. Cl.
    *C08J 9/36* (2006.01)
    *B29C 71/00* (2006.01)
    *B29C 44/34* (2006.01)
    *B29C 44/56* (2006.01)
    *B29C 71/02* (2006.01)
    *B29K 105/04* (2006.01)
    *B29K 105/00* (2006.01)

(52) U.S. Cl.
    CPC .......... *B29C 71/009* (2013.01); *B29C 44/357* (2013.01); *B29C 44/5636* (2013.01); *B29C 71/02* (2013.01); *C08J 9/36* (2013.01); *B29K 2105/045* (2013.01); *B29K 2105/25* (2013.01); *B29K 2995/0039* (2013.01); *B29K 2995/0044* (2013.01); *C08J 2205/05* (2013.01); *C08J 2300/22* (2013.01); *C08J 2300/24* (2013.01)

(58) Field of Classification Search
    CPC . B29C 44/357; B29C 44/5636; B29C 71/009; B29C 71/02; B29K 2105/045; B29K 2105/25; B29K 2995/0039; B29K 2995/0044; C08J 9/36; C08J 2205/05; C08J 2300/22; C08J 2300/24
    See application file for complete search history.

(56) References Cited

U.S. PATENT DOCUMENTS

| | | | |
|---|---|---|---|
| 3,816,233 A | 6/1974 | Powers | |
| 4,668,557 A * | 5/1987 | Lakes | B29C 44/357 264/321 |
| 6,020,390 A * | 2/2000 | Leenslag | B29C 44/5636 521/155 |
| 6,720,362 B1 * | 4/2004 | Park | B29C 44/5663 521/79 |
| 2010/0029796 A1 * | 2/2010 | Alderson | B29C 44/357 521/143 |

FOREIGN PATENT DOCUMENTS

| | | |
|---|---|---|
| EP | 0 575 771 A1 | 12/1993 |
| GB | 2 464 947 A | 5/2010 |
| GB | 2 489 457 A | 10/2012 |
| GB | 2489457 * | 10/2012 |
| WO | 99/25530 A1 | 5/1999 |
| WO | 2007/052054 A1 | 5/2007 |
| WO | WO 2016/014782 * | 1/2016 |

OTHER PUBLICATIONS

Apr. 3, 2014 Search Report issued in United Kingdom Application No. 1318129.2.
Mar. 25, 2015 Search Report issued in Euopean Application No. 14 18 5956.
Liu, Q., "Literature Review: Materials with Negative Poisson's Ratios and Potential Applications to Aerospace and Defence", DSTO Defence Science and Technology Organisation, pp. 1-37, Aug. 1, 2006.

* cited by examiner

*Primary Examiner* — John Cooney
(74) *Attorney, Agent, or Firm* — Oliff PLC

(57) ABSTRACT

A method of manufacturing a foam having a Poisson's ratio which varies across at least a region of the foam in a gradient distribution involves the steps of: a) providing a housing defining an internal space having an inlet aperture and an outlet aperture; b) providing an open-cell foam of a size and shape configured to fit inside the internal space of the housing; c) positioning the foam inside the internal space of the housing; d) establishing a flow of air through the foam via the inlet and outlet apertures; e) heating the foam to a predetermined temperature while maintaining the flow of air through the foam; and f) subsequently cooling the foam while continuing to maintain the flow of air through the foam. A foam of such a type is also presented.

13 Claims, 4 Drawing Sheets

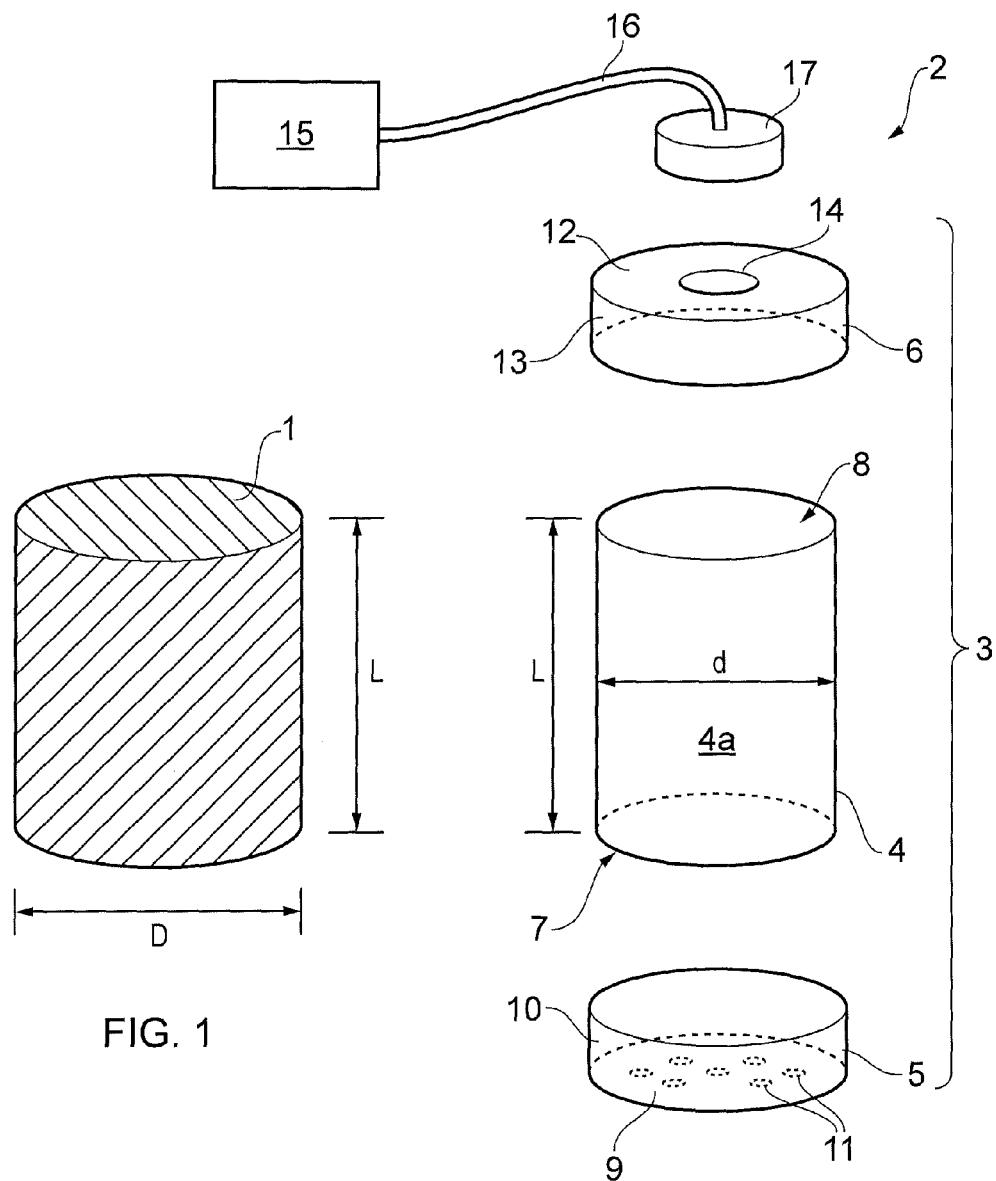

METHOD OF MANUFACTURING A FOAM SHOWING A GRADIENT POISSON'S RATIO BEHAVIOUR

The present invention relates to a method of manufacturing a foam having a Poisson's ratio which varies across at least a region of the foam, and is particularly concerned with manufacturing a foam having a Poisson's ratio which varies across at least a region of the foam in a gradient distribution.

Materials having a negative Poisson's ratio, when stretched, become thicker in a direction perpendicular to the direction of the applied force. This behaviour is a consequence of hinge-like structures within the material which flex when stretched. Materials which display a negative Poisson's ratio are often referred to as "auxetic" materials, and have very different properties to non-auxetic conventional materials having a positive Poisson's ratio. Auxetic materials have mechanical properties characterised by high energy absorption and high fracture resistance, and are also highly absorbent.

It is known that auxetic materials can be manufactured from open-cell foams such as open-cell polyurethane foam. Open-cell foams are foams in which the cells are not closed, but communicate with one another through openings in the cell walls. The cells can be considered to be defined by ribs rather than walls such that the cells create a network of interconnected pores within the foam.

WO9925530 describes a method of manufacturing auxetic foam in which a piece of low density open-cell polyurethane foam is first placed within a mould. The mould comprises sets of opposing plates which are moved towards each other to compress the foam in three orthogonal directions. Compression of the foam causes the ribs of the cells to buckle. The foam is then heated under compression to a plastic or semi-plastic state which causes the ribs to become permanently deformed. The foam is subsequently cooled to set the ribs in their deformed state thereby creating a foam in which the cells have a re-entrant structure. It is this re-entrant structure which provides the hinge-like structures that give rise to a foam having a negative Poisson's ratio.

The method described in WO9925530 involves compression of the foam across its entire extent, and is thus effective to produce an auxetic foam having a negative Poisson's ratio which is substantially uniform across the entire extent of the foam.

There are perceived to be potential advantages to an auxetic foam having a Poisson's ratio which varies across its extent. For example, certain applications for sound proof panels, acoustic linings, duct liners, vibration mat pads and filters could be improved if such an auxetic material could be provided. However, heretofore there have not been provided any suitable methods to produce such a foam.

It is a preferred object of the present invention to provide an improved method of manufacturing a foam, and more particularly to provide a method of manufacturing a foam having a Poisson's ratio which varies across at least a region of the foam in a gradient distribution.

It is another object of the present invention to provide a foam having a Poisson's ratio which varies across at least a region of the foam in a gradient distribution.

According to a first aspect of the present invention, there is provided a method of manufacturing a foam having a Poisson's ratio which varies across at least a region of the foam in a gradient distribution, the method being characterised by the steps of:

a) providing a housing defining an internal space having an inlet aperture and an outlet aperture, the inlet and outlet apertures being in fluid communication with the internal space and spaced from one another across the internal space;

b) providing an open-cell foam of a size and shape configured to fit inside the internal space of the housing;

c) positioning the foam inside the internal space of the housing;

d) establishing a flow of air through the foam via the inlet and outlet apertures;

e) heating the foam to a predetermined temperature whilst maintaining said flow of air through the foam; and f) subsequently cooling the foam whilst continuing to maintain said flow of air through the foam.

Preferably, step b) involves providing the foam in an uncompressed configuration which is larger than the internal space of the housing in at least one dimension, in which case step c) involves compressing the foam such that when the foam is positioned inside the housing it is collapsed.

Step d) may involve applying a vacuum to the outlet aperture, and steps e) and f) may both involve maintaining said vacuum.

Said housing may optionally have a plurality of said inlet apertures.

Said housing may be elongate and so as to have a first end and a second end, with the or each said inlet aperture being provided at said first end, and said outlet aperture being provided at said second end.

Preferably, at least one of i) the or each said inlet aperture, and ii) said outlet aperture, is provided through an end cap configured to engage and close a respective end of the housing.

Said open-cell foam may be an amorphous solid or non-crystalline solid.

Said predetermined temperature is preferably greater than the glass transition temperature of the foam and lower than the melting temperature of the foam.

The foam is preferably made from polymeric material.

In a preferred embodiment the predetermined temperature is not less than 120° C. and not more than 170° C. This temperature range is suitable for PU-PE foams.

Step f) may involve cooling the foam to a temperature below the softening point of the foam.

Step e) may be performed in an oven.

According to another aspect of the present invention, there is provided a foam produced by the method outlined above.

According to a further aspect of the present invention, there is provided a foam having at least a region across which the Poisson's ratio of the foam varies in a gradient distribution.

Preferably the foam has a first region which exhibits a positive Poisson's ratio, a second region spaced from the first region and which exhibits a negative Poisson's ratio, and an intermediate region located between said first and second regions and across which the Poisson's ratio of the foam varies in a gradient distribution from a positive value to a negative value.

Alternatively, the foam may have at least a region across which the Poisson's ratio of the foam varies in a gradient distribution of positive values.

In another alternative embodiment, the foam may have at least a region across which the Poisson's ratio of the foam varies in a gradient distribution of negative values.

So that the invention may be more readily understood, and so that further features thereof may be appreciated, embodiments of the invention will now be described by way of example with reference to the accompanying drawings in which:

FIG. 1 is a schematic perspective view showing a piece of open-cell foam used in an embodiment of the method of the present invention;

FIG. 2 is a schematic exploded view showing example apparatus used to carry out the method of the present invention;

Figure 3:
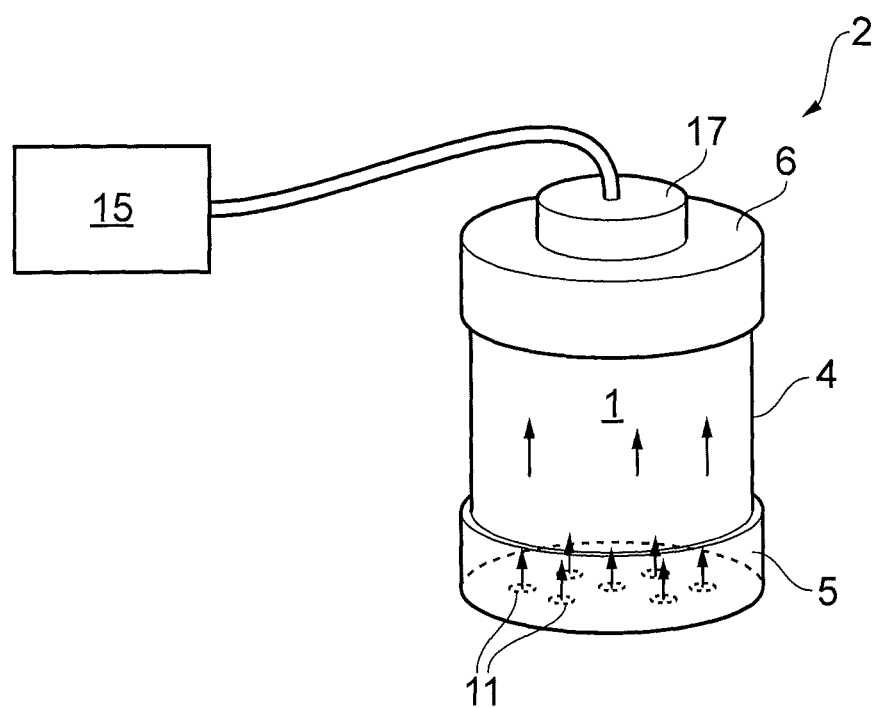
FIG. 3 is a schematic illustration showing the apparatus of FIG. 2 assembled and containing the foam of FIG. 1.
Figure 4:
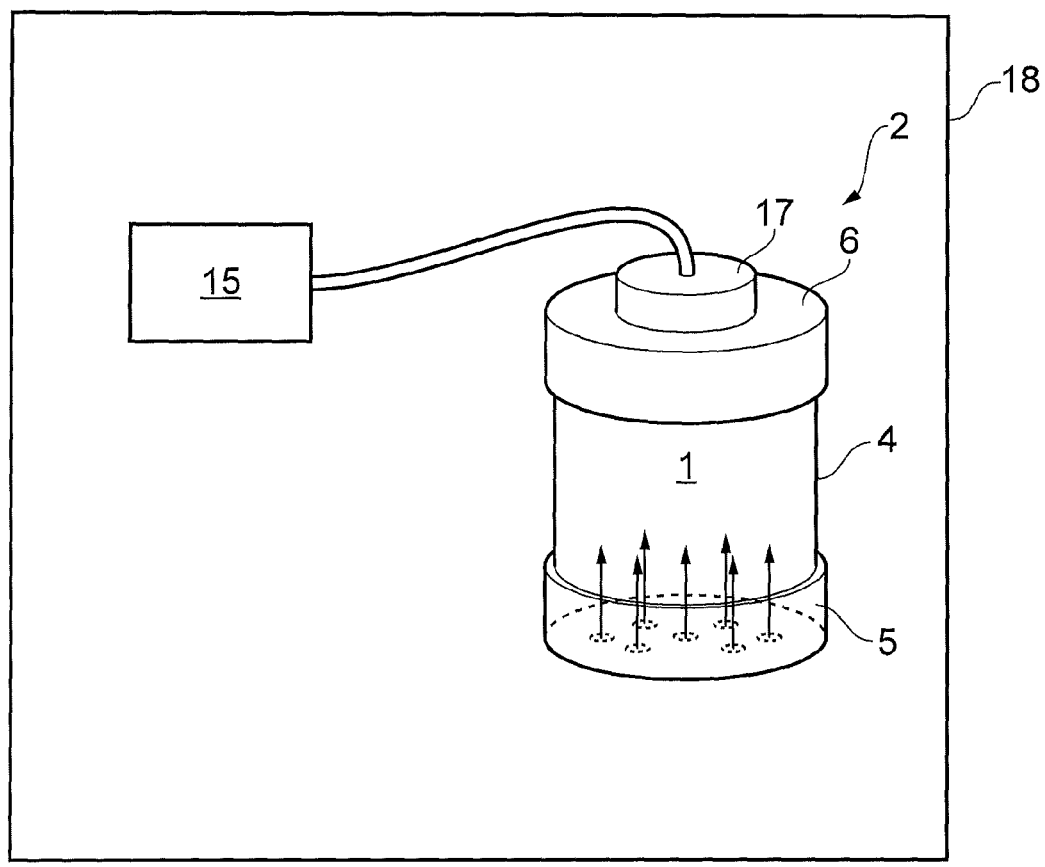
FIG. 4 is a schematic illustration similar to that of FIG. 3, but which shows the apparatus and the foam inside an oven.

Turning now to consider the drawings in more detail, FIG. 1 illustrates cylindrical piece of foam 1 having an axial length L and a diameter D in its natural uncompressed condition. The foam cylinder 1 is formed from a low density open-cell foam material such as open-cell polyurethane foam which has a known and predetermined softening point $T_S$, the softening point being the temperature at which the foam softens beyond a predetermined softness. FIG. 2 shows a number of component parts which make up an apparatus 2 suitable for use in an embodiment of the method of the present invention. The apparatus includes a housing 3 which comprises a main body part 4 and a pair of end caps 5, 6. The main body 4 of the housing illustrated is provided in the form of an elongate and substantially rigid metal cylindrical tube, which is open at both of its ends 7, 8. The main body 4 defines an internal space 4a, which in this embodiment has an axial length which may be equal to, or somewhat longer than, the length L of the uncompressed foam cylinder 1, and a diameter d which is somewhat smaller than the diameter D of the uncompressed foam cylinder 1. The end regions of the main body 4 are preferably externally screw-threaded (not shown) in order to engage the end caps 5, 6 as will be explained in more detail below.

The first end cap 5, indicated as the lower end cap in FIG. 2, comprises a circular plate 9 from which extends (upwardly in the orientation illustrated) a peripheral side wall 10, and which is preferably made from similar metal to the main body 4. The side wall 10 is preferably internally screw-threaded (not shown) in order to threadedly engage and thereby close the first end 7 of the main body 4. A plurality of small inlet apertures 11 are shown provided through the plate 9 of the first end cap 5. In the particular arrangement illustrated, the inlet apertures 11 are provided in spaced-apart relation to one another in a generally regular array. It is to be appreciated, however, that other inlet arrangements are possible; for example an irregular array of inlet apertures 11 could be provided through the plate 9; or alternatively a single inlet aperture 11 could be provided through the plate 9.

The second end cap 6, indicated as the upper end cap in FIG. 2, has a generally similar basic configuration to the first end cap 5, and thus comprises a circular plate 12 from which extends (downwardly in the orientation illustrated) a peripheral side wall 13, and which is again preferably made from similar metal to the main body 4. The side wall 13 is preferably internally screw-threaded (not shown) in order to threadedly engage and thereby close the second end 8 of the main body 4. Alternatively, this can be achieved using a metal base with no thread but locked in position through external features. An outlet aperture 14 is provided through the plate 12 of the second end cap 6.

Also shown in FIG. 2 is a vacuum pump 15 which is fluidly connected via a heat-resistant pipe 16 to a manifold 17 which is configured for sealing connection to the end cap 6 over the outlet aperture 14.

The method of the illustrated embodiment involves positioning the foam cylinder 1 inside the internal space 4a defined by the main body 4 of the housing. Because the diameter D of the foam cylinder is larger than the internal diameter d of the main body 4, the foam 1 must be radially compressed in order to fit inside the housing. As will be appreciated, when the foam 1 is placed inside the body part 4, the body part will maintain the foam under radial compression. The compressive force which is applied to the foam 1 and which is maintained when the foam is positioned inside the body part 4 of the housing is effective to collapse the foam's structure and hence deform the ribs of its cells.

When the foam 1 has been positioned inside the body part 4 as described above, the first and second open ends 7, 8 of the body part 4 are closed by the first and second end caps 5, 6 respectively. As will be appreciated, in the preferred arrangement illustrated this is achieved by threadedly engaging the end caps over the respective end regions of the body part. The plates 9, 12 of the end caps are thus brought into close proximity, or contact, with the end faces of the foam cylinder 1 without significantly compressing the foam cylinder in an axial sense.

In the arrangement illustrated the foam 1 will not be significantly compressed in an axial direction. because its uncompressed length L is either equal to, or somewhat shorter than the length of the body part 4. The end caps 5, 6 preferably engage the body part 4 in a substantially hermetic manner.

The vacuum manifold 17 is then sealed to the upper end cap 6 over the outlet aperture 14 as illustrated in FIG. 3 and the vacuum pump 15 is activated. The pump 15 draws a flow of air through the compressed foam 1, the airflow entering the housing 3 via the inlet apertures 11 in the first end cap 5, passing (generally upwardly in the orientation illustrated) through the compressed foam 1 inside the housing 3, and exiting the housing via the outlet aperture 14 in the second end cap 6.

Whilst the vacuum pump 15 is operating, the entire apparatus 2 is placed inside an oven 18 and the temperature of the oven is increased above the softening point of the foam material but below the melting point of the foam material, which thereby heats the foam 1 to a temperature above its softening point without the foam material melting.

The apparatus is left in the oven 18 for a predetermined period of time, depending on the final properties desired of the final foam material, whilst the vacuum pump 15 is continuously in operation. Merely as a guide, it is to be noted that during experimental work the present invention was found to be effective when the foam was kept in the oven for around 45 minutes at an oven temperature of 180° C. However, the actual duration required will depend on many factors including: mould dimensions and material; the type of foam used; the dimensions of the foam sample; the pre-set temperature of the oven and other characteristics of the oven.

As will be appreciated, the flow of air which is thus drawn through the foam 1 is a flow of heated air inside the oven 18. The compressed foam 1 thus becomes heated to a temperature (which is controlled by a thermocouple) which is above the softening point and below the melting point of the foam material. Alternatively, based on an adequate foam time-exposure to a stable oven's temperature, the compressed foam 1 thus becomes heated to a temperature which is substantially equal to the temperature to which the oven 18 is set, thereby obviating the need for any direct internal monitoring of the foam's temperature, and also heats the foam 1 in a homogeneous manner throughout its entire extent.

As the air is drawn through the compressed foam 1, a gradient distribution of pressure is established throughout the entire axial length of the foam 1. This is caused by the collapse of the foam's internal structure and deformation of its internal ribs due to being held in compression inside the housing 3, which effectively creates a tortuous path for the flow of air through the foam. The local pressure in the lower region of the foam 1 adjacent the air inlet apertures 11 is relatively low, but the pressure builds with increasing distance from the inlet apertures to reach a significantly higher value in an upper region of the foam 1 adjacent the outlet aperture 14. Depending on the foam dimension and its microstructure, the axial compression of the foam 1 may be constant over the entire length of the foam, therefore the distribution of internal pressure in this manner may be substantially linear along the length of the foam.

The apparatus 2 is then removed from the oven 18 and allowed to cool down to ambient temperature, whilst the vacuum pump 15 continues to operate. The foam 1 is thus cooled to a temperature below the softening point of the foam material with cooling ambient air being drawn through it by the pump 15.

Figure 5:
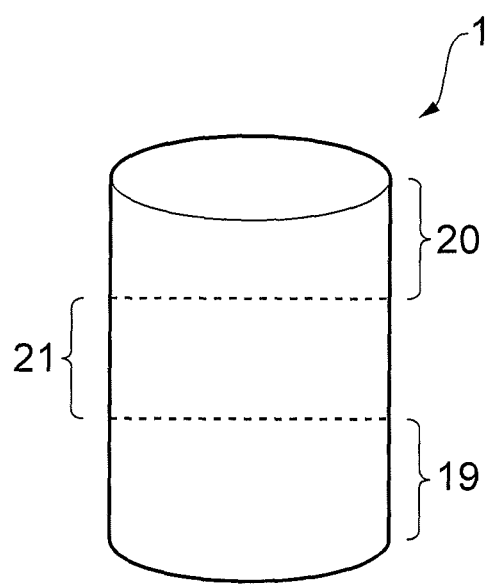
FIG. 5 is a schematic illustration showing a piece of foam manufactured according to the present invention.

The foam produced by the above-described method has very interesting properties. The resulting foam 1, shown schematically in FIG. 5, displays generally conventional properties in a first end region 19 which was located adjacent the air inlet apertures 11 during the above-described method and hence was subject to a relatively low internal airflow pressure. However, the foam 1 displays auxetic properties in a second end region 20 which was located adjacent the air outlet 14 and hence was subject to a relatively high internal airflow pressure. In other words, the foam 1 has a positive Poisson's ratio in the first end region 19, but a negative Poisson's ratio in second end region 20. However, what is particularly interesting is that in the intermediate region 21 of the foam, the foam material has a Poisson's ratio which varies in a gradient distribution from a positive value at the first region 19 to a negative value at the second region 20.

The above-described linear distribution of Poisson's ratio gives the foam 1, and in particular the intermediate central region 21 (which can be subsequently cut or otherwise removed from the whole piece of foam 1 for use on its own) unique properties. Not only does the Poisson's ratio vary in a gradient distribution in this region of the foam, but so does the stiffness of the resulting foam material.

As will be appreciated, the degree by which the internal structure of the foam 1 is collapsed affects the degree to which its internal ribs are deformed, which in turn affects the tortuosity of the air flow-path through the foam. By reducing the radial compression to which the foam is subjected inside the housing 3, the maximum internal air pressure inside the foam is reduced, and by increasing the radial compression the maximum internal air pressure is increased. The degree of compression to which the foam is subjected by the apparatus 2 thus affects the degree and nature of the final foam's auxetic properties, and can thus be varied depending on the nature of the foam required to be produced. Similarly, varying the permeability of the initial foam sample used in the method can produce similar effects, the foam's tortuosity being related to its permeability.

Whilst the invention has been described above with particular reference to treatment of a foam which is only compressed radially, it is envisaged that in other embodiments the foam could be compressed axially as well as, or instead, of radially. Indeed, the foam 1 could be compressed in other more complicated ways. It is even possible to obtain a linear distribution of Poisson's ratio in a foam which is not compressed at all during the steps of heating and flowing air through it.

It is anticipated that foam produced according to the method of the present invention will have particular application for sound proof panels, acoustic lining such as duct liners, vibration mat pads and filters for use with gases or liquids.

It should be recognised that the invention is not limited to polymeric thermosetting foams, but may, for example be applied to other types of foams such as thermoplastic foams.

Furthermore, it is to be noted that whilst the invention has been described above with reference to an embodiment involving the steps of heating the foam to predetermined temperature which is greater than the softening point of the foam, and subsequently cooling the foam to a temperature below the softening point, in alternative embodiments the glass transition temperature of the foam may be used as a reference temperature instead of the softening point of the foam. In such embodiments, therefore, the step of heating will involve heating the foam to a predetermined temperature above the glass transition temperature of the foam, and the step of cooling will involve cooling the foam to a temperature below the glass transition temperature of the foam.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for to performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

The invention claimed is:

1. A method of manufacturing a foam having a varying Poisson's Ratio, the method comprising the steps of:
    a) providing a housing defining an internal space having at least one inlet aperture and an outlet aperture, the inlet and outlet apertures being in fluid communication with the internal space and spaced from one another across the internal space;
    b) providing an open-cell foam of a size and shape configured to fit inside the internal space of the housing;
    c) positioning the foam inside the internal space of the housing;
    d) establishing a flow of air through the foam via the inlet and outlet apertures, such that the local pressure within the foam varies with increasing distance from a value at or near the inlet aperture to a higher value thereof at or near the outlet aperture;

e) heating the foam to a predetermined temperature whilst maintaining said flow of air through the foam; and f) subsequently cooling the foam whilst continuing to maintain said flow of air through the foam, wherein the Poisson's ratio of the cooled foam varies with increasing distance from a value at or near the inlet aperture to a lower value thereof at or near the outlet aperture.

2. A method according to claim 1, in which step b) involves providing the foam in an uncompressed configuration which is larger than the internal space of the housing in at least one dimension, and wherein step c) involves compressing the foam such that when the foam is positioned inside the housing it is collapsed.

3. A method according to claim 1, in which step d) involves applying a vacuum to the outlet aperture, and steps e) and f) both involve maintaining said vacuum.

4. A method according to claim 1, wherein said housing has a plurality of said inlet apertures.

5. A method according to claim 1, wherein said housing comprises an elongate body part having first end and a second end, the or each said inlet aperture being provided at said first end, and said outlet aperture being provided at said second end.

6. A method according to claim 5, wherein at least one of i) the or each said inlet aperture, and ii) said outlet aperture, is provided through an end cap configured to engage and close a respective end of the body part.

7. A method according to claim 1, wherein said open-cell foam is an amorphous solid or non-crystalline solid.

8. A method according to claim 7, wherein said predetermined temperature is greater than the glass transition temperature of the foam and lower than the melting temperature of the foam.

9. A method according to claim 1, wherein the predetermined temperature is not less than 120° C. and not more than 170° C.

10. A method according to claim 7, wherein step f) involves cooling the foam to a temperature below the glass transition temperature of the foam.

11. A method according to claim 1, wherein the cooled foam has a first region at or near the inlet aperture which exhibits a positive Poisson's ratio, a second region at or near the outlet aperture and spaced from the first region and which exhibits a negative Poisson's ratio, and an intermediate region located between said first and second regions and across which the Poisson's ratio of the foam varies with increasing distance from a positive value to a negative value.

12. A method according to claim 1, wherein the foam has at least a region across which the Poisson's ratio of the foam varies with increasing distance from a positive value to a smaller positive value.

13. A method according to claim 1, wherein the foam has at least a region across which the Poisson's ratio of the foam varies with increasing distance from a negative value to a larger negative value.

\* \* \* \* \*